United States Patent [19]

Soulier

[11] 4,454,081

[45] Jun. 12, 1984

[54] METHOD AND APPARATUS FOR MOLDING EXPANDABLE THERMOPLASTIC PARTICLES IN MOLDS HAVING PORTIONS OF SELECTED POROSITY USING UHF HEATING

[75] Inventor: Joël Soulier, Anet, France

[73] Assignee: Isobox S.A., Bannalec, France

[21] Appl. No.: 299,196

[22] Filed: Sep. 3, 1981

[30] Foreign Application Priority Data

Sep. 11, 1980 [FR] France ................ 80 19606

[51] Int. Cl.³ .................. B29D 27/00; B29H 5/26
[52] U.S. Cl. ................................. 264/26; 249/78;
249/80; 249/113; 264/53; 264/337; 425/84;
425/174.8 E; 425/817 R; 425/DIG. 119
[58] Field of Search .............. 264/26, 25, 53, 51,
264/337; 249/113, 78, 80; 425/DIG. 119, 84,
174.8 E, 817 R

[56] References Cited

U.S. PATENT DOCUMENTS

| 1,238,347 | 8/1917 | Sebring et al. ............... 249/113 |
| 1,336,180 | 4/1920 | Allen et al. ............. 425/DIG. 119 |
| 1,592,536 | 7/1926 | O'Neill .................. 425/DIG. 119 |
| 1,948,989 | 2/1934 | McEwan ................. 249/113 X |
| 2,733,494 | 2/1956 | Bryer et al. ................... 425/84 |
| 2,851,931 | 9/1958 | Leitzel ..................... 249/113 |
| 2,915,801 | 12/1959 | Harry ........................ 425/84 X |
| 2,981,330 | 4/1961 | Stickney et al. ............. 249/113 |
| 3,001,582 | 9/1961 | Kindseth et al. .......... 249/113 X |
| 3,243,860 | 4/1966 | Whittaker et al. ............. 425/84 |
| 3,253,064 | 5/1966 | Buonaiuto .................. 264/53 X |
| 3,278,658 | 10/1966 | Immel ........................ 264/51 |
| 3,353,219 | 11/1967 | Snyder .................... 249/113 X |
| 3,431,331 | 3/1969 | Pincus et al. ............ 249/113 X |
| 3,737,266 | 6/1973 | Yamamoto ............... 249/113 X |
| 3,838,001 | 9/1974 | Greiner et al. ............ 425/84 X |
| 4,192,638 | 3/1980 | Lezier et al. ............. 249/113 X |

FOREIGN PATENT DOCUMENTS

| 48198 | 3/1982 | European Pat. Off. ........... 249/113 |
| 1243882 | 9/1960 | France ....................... 425/84 |
| 792351 | 3/1958 | United Kingdom ............. 425/84 |
| 1113629 | 5/1968 | United Kingdom ............. 425/84 |

Primary Examiner—Philip E. Anderson
Attorney, Agent, or Firm—Oblon, Fisher, Spivak, McClelland & Maier

[57] ABSTRACT

These novel molds are characterized in that they contain a cavity in porous material which is not monolithic, but which, on the contrary, is constituted by zones B with high capillary forces and by zones A with low capillary forces for liquids. The process of using these novel molds is useful for the manufacture of expanded plastics articles.

15 Claims, 6 Drawing Figures

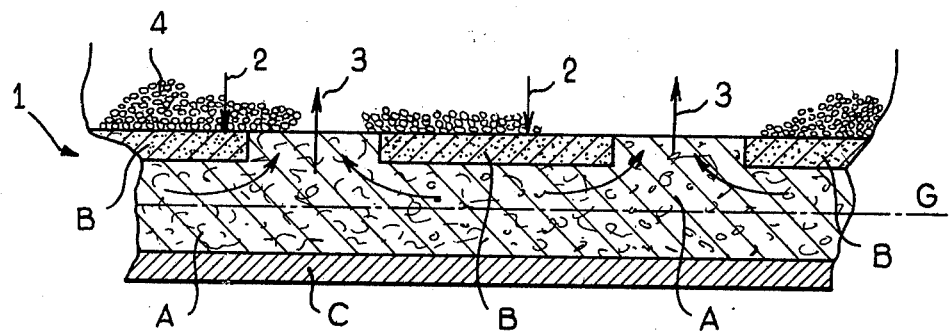
FIG_1
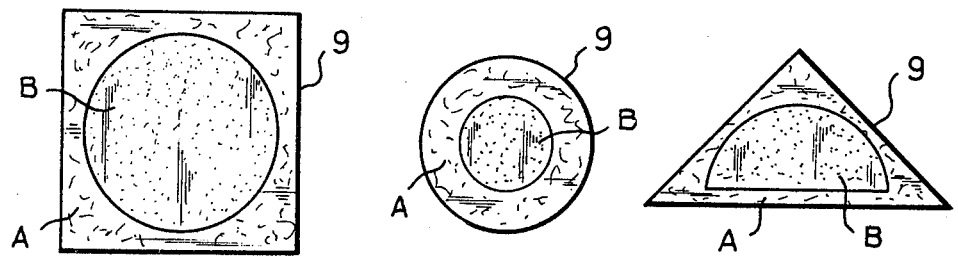
FIG_2
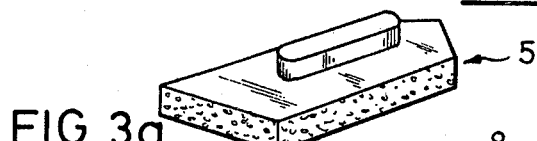
FIG_3a
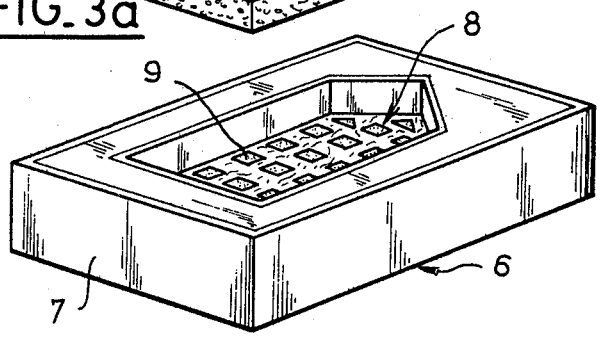
FIG_3b
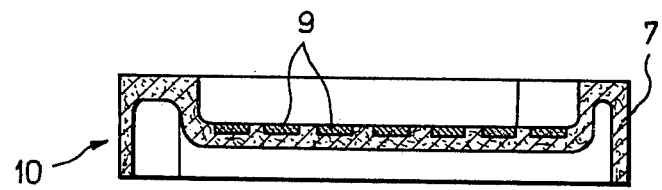
FIG_3c

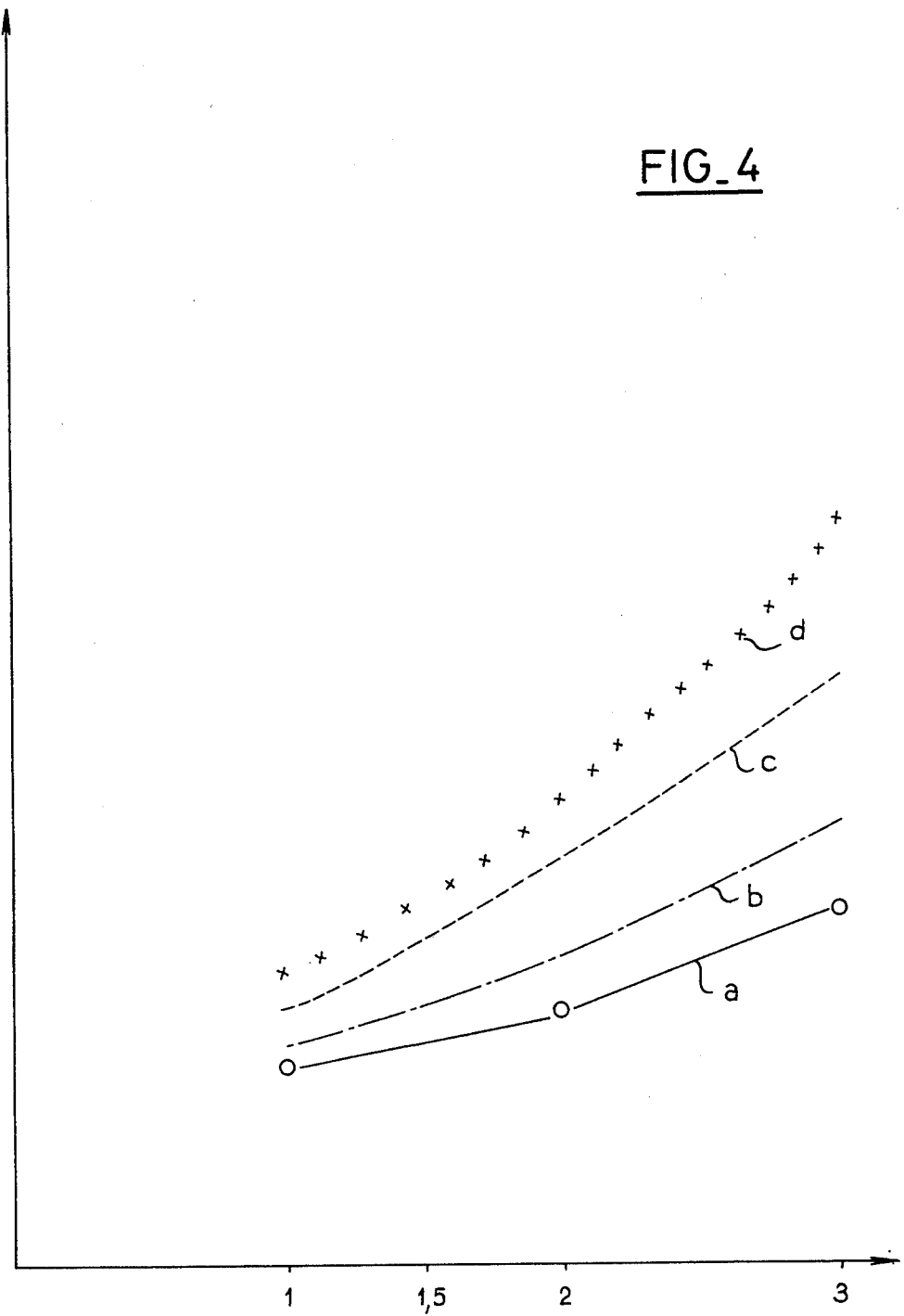

METHOD AND APPARATUS FOR MOLDING EXPANDABLE THERMOPLASTIC PARTICLES IN MOLDS HAVING PORTIONS OF SELECTED POROSITY USING UHF HEATING

BACKGROUND OF THE INVENTION

1. Field of the Invention

The present invention relates to novel molds designed for the manufacture of articles of expanded, non-polar plastics material, by means of ultra-high-frequency radiation (UHF).

2. Description of the Prior Art

UHF waves, which are currently named microwaves and which are situated between about 300 MHZ and 30 GHZ, are very widely applied at the present time, both in the medical field and in the scientific or industrial field.

This energy is instantaneously available, it is propagated in all atmospheres (under vacuum, under pressure, in a cold, hot or ventilated environment, ... ), and it can also be very easily servocoupled. The principle thereof is very simple: the application of a continuous electrical field to an electrically sensitive material aligns the molecules of the said material parallel to the field as if it involved micro-magnets. In an electrical field alternating at very high frequency, the magnet-molecules cannot follow the lines of the fields due to inertial forces. It is hence by knocking these inertial forces that "microwave" energy is transformed into heat. On the other hand, when the material treated is electrically neutral, the microwaves pass through it, as if it did not exist: it is said that the material is transparent. Accordingly, attempts have been made to utilize this particularly economical and highly selective energy—enabling a specific effect on a given target—in the field of manufacturing expanded plastics materials. Thus, by moistening a non-polar plastics material (hence transparent to UHF radiation) in the form of preexpanded particles of, e.g., polystyrene containing a blowing agent, with a polar liquid, and by subjecting these particles so moistened to UHF radiation, expanded plastics materials are produced elegantly and economically (cf. particularly commonly assigned French Patent Applications Nos. 2 298 571 and 2 368 513). Such a technique constitutes a considerable advance with respect to traditional transforming techniques, consisting in introducing into a mold a certain amount of unexpanded material and then causing pressurized steam to penetrate therein, at a sufficient temperature to contribute the heat necessary to initiate the expansion process.

However, this method of molding by means of microwaves still has a drawback: the molds used are conventional molds, made of a material transparent to UHF radiation (or absorbing very little of this radiation), which has as a consequence an absence of homogeneity of heating and an increase in the expenditure of energy, due to the fact it is necessary to reheat the walls of the mold on each molding cycle. This drawback has been surmountable by means of a novel device developed by my assignee (cf. French Patent Application No. 2 402 526), which device comprises a mold whose impression is formed of a material having high dielectric losses, absorbing UHF radiation, whilst the body itself of said mold is formed of a material non-absorbent to UHF radiation.

These particularly advantageous methods and devices, requiring no capacitative circuit, enabling the use of voltages which are not high and ensuring a high homogeneity of the molded, expanded plastics materials obtained, have assuredly been at the origin of the very considerable development of foamed plastics. However, it has been observed that the necessity of having cavities possessing very precise electrical characteristics, made it a requisite to incorporate in said cavities additives possessing loss factors which were linear with temperature. These additives (for example carbon, titanium oxide, barium titanate, etc. ... ) are often expensive, the preparation of said cavities is always difficult, and moreover, the mechanical characteristics of said cavities sometimes leaves something to be desired. Accordingly, novel molds have been proposed with a low or zero loss angle, and with a cavity which is produced in porous material. The porous nature of this cavity results in the situation that, if the said cavity is transparent to UHF radiation in the dry state, on the contrary it absorbs UHF radiation on the addition of a polar liquid, since this liquid is absorbed by the pores of said impression (cf. in particular commonly assigned French Patent Application No. 2 441 474 as well as French Patent No. 1,508,963 of R. B. BUONAIUTO). Porous molds are simple in design and do not necessitate any additive absorbing UHF radiation.

However, after several years of operation the following phenomenon has been observed: the heat gradient in the porous mass (for example, the ceramic wall) being reversed with respect to conventional heating, it results therefrom that the pressure of the steam (or of another polar substance) formed by the conversion of electromagnetic energy into heat is greater in the interior than on the surface of said porous wall. As a result, at the beginning of heating, whilst vaporization has already started in the interior, the surface layers are still in a liquid phase. The pressure in the interior of the porous mass being higher than at the surface,—and since the porous structures of all cavities and walls used until now are monolithic—, this vapor pressure coming from the inside of the porous mass, prevents the balanced reabsorption of the water occurring at the surface or condensed on the surface of the wall or of the cavity, in contact with the foamed plastics. In other words, the capillary pressure of all the cavities and porous walls of molds used until now being lower than the pressure of the steam (or of another polar substance) coming from the inside of the porous mass, the recycling and reabsorption of the water (or of another polar substance) condensed on the surfaces of the walls and in contact with the foamed plastics is thus considerably disturbed. To avoid this drawback, it is at present necessary either to stop the heating from time to time to permit suitable reabsorption of the condensed water, or to introduce additional heating (as is the case in French Patent No. 1,508,963) to evaporate completely the condensed water. In both cases, there is an undesirable increase in the cost price of molding, which can reach proportions which are not negligible.

It is a particular object of the present invention to overcome these disadvantages by providing a novel mold for the fabrication of expanded plastics materials in particulate form (e.g., polystyrene beads) which responds to the various necessities of practice better than previously known molds with a porous cavity (such as for example those described in French Patent Application No. 2 441 474 and French Pat. No. 1 508 963).

It is also a particular object of the invention to provide a novel mold and method of molding which permit a substantial economy in energy and which permit a considerable shortening of the fabrication cycle.

Other objects and advantages of the present invention will become apparent from the description which follows.

GENERAL DESCRIPTION OF THE INVENTION

According to the present invention there is provided a novel mold for the manufacture of articles of expanded, non-polar particulate plastics materials, by means of UHF radiation, characterized in that it contains a cavity in porous material which is not monolithic, but which, on the contrary, is constituted by zones B with high capillary forces and zones A with low capillary forces for liquids.

The fact of creating on the surface of the cavity on the one hand zones whose capillary forces are high to bring the water condensed on the surface to the inside (to replace that which is evaporated) and on the other hand, zones with low capillarity for liquids, but allowing the vapor formed to escape even inside of the cavity permits a harmonious water-steam circulation which does not interrupt the molding process and which does not necessitate the addition of supplementary heat.

According to a particularly advantageous embodiment of the mold according to the present invention, the ratio of the surface areas of zones A and of zones B is selected according to the article (thickness and surface area) to be molded.

Another advantage, very important, of the invention consists in that it is possible to regulate and adjust the flow rate of the vapor according to the article, by selecting cavities whose zone A/zone B ratios are appropriate.

According to a particular feature of this embodiment, the ratio of the surfaces A/B is comprised between (10/90) to (90/10) and preferably equal to (50/50).

It is precisely when the ratio A/B equals 50/50 that one obtains, (for a constant UHP power) the best residual moisture rate in the plastics form, and the highest rate of steam emission.

In accordance with the invention, the mold cavity is coated with an impermeable layer, on the side adjacent to the body of the mold.

According to the invention, the cavity of the mold is formed by a plurality of modules, or juxtaposed mini-cavities of desired size and shape, each of these small modules preserving the same ratio of the surfaces A/B as the whole of the cavity.

This variation according to the invention is particularly advantageous: molds so constructed are lighter and mechanically stronger (porous cavities of large surface area are very fragile). Moreover, it is very easy to form cavities of desired sizes and shapes for all desired molded articles by simple juxtaposition of said modules on the body of the mold.

According to another aspect of the present invention there is provided a method of molding articles of expanded plastics materials, characterized in that a mold of suitable shape and size is prepared, by selecting a suitable ratio between the surface areas of the zones A and B of the cavities, according to the size and thickness of the article to be molded, distributing in the cavity the appropriate amount of polar liquid, and as soon as absorption of said polar liquid by the porous cavity occurs, closing the mold, introducing the pre-expanded plastics material therein, and subjecting the whole to UHF radiation.

Besides the foregoing features, the invention comprises still other features, characteristics and advantages, which will emerge from the description which follows.

The present invention is also directed more particularly at molds for the fabrication of expanded plastics materials, in accordance with the foregoing features, as well as all installations, overall processes and manufacturing lines for articles molded of expanded plastic material in which the devices according to the present invention are included.

BRIEF DESCRIPTION OF THE DRAWINGS

The invention will be better understood by means of the additional description which follows, with reference to the accompanying drawings and graphs representing a mold and an impression according to the invention and their characteristics.

In the drawings:

FIG. 1 shows a section through the cavity in a mold according to the invention;

FIG. 2 shows some forms of modules: round, square and triangular in a mold according to the invention;

FIG. 3 shows an embodiment of a mold for molding cement trowels; and

FIG. 4 shows a group of graphs showing the relationship between the thickness of the cavity and the thickness of the molded article for several qualities of ceramic material produced by the method according to the invention.

It must be understood, however, that the drawings and graphs are given purely by way of illustration of the invention and do not constitute a limitation thereof in any way.

DESCRIPTION OF PREFERRED EMBODIMENTS

FIG. 1 shows a section of a cavity 1: therein is clearly distinguished the zones B (zones with high capillary forces for the liquid 2) and zones A (locations of preferred passages for the vapor 3), C being the impermeabilized layer of the cavity 1 which is adjacent to the body of the mold. As for all heating methods by means of microwaves, the heat gradient is reversed, the formation of the vapor takes place on the middle line G. Due to the fact of the difference in structure between the zones A and B, the vapour 3 escapes more easily, through the passages in material A. Conversely, the condensate which occurs on the surface of the cavity 1 or in contact with the beads 4 of the plastics material will be more easily absorbed through the zones B. This composite structure of the cavity 1 permits the balanced reabsorption of water (or of other polar liquid) which is condensed and thereby the harmonious progress of the molding operation.

FIG. 2 shows some forms which the modules can assume: round, square and triangular. Other shapes are, of course, possible. By the juxtaposition of these modules, it is possible to create a cavity of desired shape and surface area, since each of these modules is a mini-cavity endowed with zones A and B with different capillary forces.

FIG. 3 shows an example of the construction of a mold for molding cement trowels 5. The mold, of which only the female portion 6 is shown, is composed of a body 7 formed of epoxy resin containing pure silica fibers, and of the cavity 8. This cavity 8, in this non-limiting example, is not produced in a single part, but is constituted from 32 modules 9 of ceramic distributed thus: 21 square, 6 triangles, 3 rectangles, 2 circles: the whole represents a surface area of 408 cm². Each of these modules 9 includes the two zones A and B in the proportions 50/50. These modules 9, as can be seen in the cross-section 10 of the female portion of the mold—are juxtaposed side-by-side on the surface of the body of the mold 7 of epoxy resin containing silica fibers.

In order to demonstrate the extraordinary advantage represented by the mold according to the invention, Applicant has carried out the following experiment. Two molds of strictly identical shape were constructed for the manufacture of cement trowels of expanded polystyrene, of a total weight of 30 g. One of these molds was constructed as shown in FIG. 3 according to the invention; the second, on the other hand, contained a cavity formed in a single part and monolithic, that is to say without separation into zones A and B.

Table 1 below compares the results obtained.

TABLE I

|  | Mold according to the invention | Monolithic mold |
|---|---|---|
| Total weight of mold | 2.5 kg | 6.5 kg |
| Weight of ceramic necessary | 0.960 kg | 3.360 kg |
| Vaporization time | 35 seconds | 75 seconds |
| Heat necessary | 82 Kcal. | 173 Kcal. |
| Cooling time | 50 seconds | 90 seconds |
| Total time (manufacturing cycle) | 85 seconds | 165 seconds |

It results very clearly that to have the same part (a cement trowel for example), of the same quality, the cycle with an ordinarily mold is practically twice as long and the energy consumption is more than double. Moreover, the mold according to the invention, whose cavity is composed of juxtaposed modules, in much lighter, easier to construct, necessitating less ceramic, but much less fragile and much stronger mechanically than ordinary molds.

The accompanying FIG. 4 shows a group of graphs giving the relationship between the thickness of the impression and the thickness of the molded article for several qualities of ceramic: (as abscissae the thickness of the porous impression in centimeters, as ordinates—a logarithmic curve—the thickness in centimeters of the molded article)
monolithic ceramic (curve a)
ceramic according to the invention with ratio $$\frac{zone\ A}{zone\ B} = \frac{10}{90}\ (curve\ b)$$

ceramic according to the invention with ratio $$\frac{zone\ A}{zone\ B} = \frac{80}{20}\ (curve\ c)$$

ceramic according to the invention with ratio $$\frac{zone\ A}{zone\ B} = \frac{50}{50}\ (curve\ d)$$

It is, as is seen in FIG. 4, for the ratio $$\frac{ZONE\ A}{ZONE\ B} = \frac{50}{50}$$

that the relationship $$\frac{thickness\ of\ the\ impression}{thickness\ of\ the\ molded\ article}$$

is the most favorable.

This emerges also from Table II below which gives the relationship between quality of the impression and the amount of vapor emitted (at constant UHF power).

TABLE II

| Ceramic | Amount of vapor emitted (per g) per cm² of cavity |
|---|---|
| Monolithic | 0.05 |
| According to the invention with the ratio $\frac{A}{B} = \frac{10}{90}$ | 0.07 |
| According to the invention with the ratio $\frac{A}{B} = \frac{80}{20}$ | 0.09 |
| According to the invention with the ratio $\frac{A}{B} = \frac{25}{75}$ | 0.13 |
| According to the invention with the ratio $\frac{A}{B} = \frac{50}{50}$ | 0.17 |

The cavity according to the invention emits three times more vapor than the customary monolithic cavity, in particular when the ratio $$\frac{zone\ A}{zone\ B} = \frac{50}{50}$$

(all things being otherwise equal).

Thus, as emerges from the foregoing, the invention is in no way limited to those methods of practise, embodiments and applications which have just been described more explicitly; it encompasses, on the contrary, all modifications which may come to the mind of the technician skilled in the art, without departing from the scope or the spirit of the present invention.

I claim:

1. A method of manufacturing expanded, non-polar plastic articles from pre-expanded particles, said method comprising the steps of:
   (a) preparing a mold of suitable shape and size from at least two juxtaposed porous materials which together define a porous mold cavity, the first of said at least two juxtaposed porous materials forming one or more zones A fronting on the surface of the mold cavity which have capillary forces which allow vapor developed in the interior of the cavity to escape from it into the mold, and the second of said at least two juxtaposed porous materials forming one or more zones B fronting on the surface of the mold cavity which have capillary forces which bring liquid from the interior of the mold to the mold cavity, thereby creating a harmonious liquid-vapor circulation, and an impervious layer on the opposite side of said at least two juxtaposed porous materials from the mold cavity, which impervious layer prevents or retards loss of liquid from the mold and which thereby cooperates with said at least two juxtaposed porous materials to create said harmonious liquid-vapor circulation; then (b) distributing in the mold cavity the appropriate amount of a polar liquid;

(c) introducing into the mold pre-expanded plastic material in particulate; and (d) subjecting the mold to UHF radiation.

2. A method as recited in claim 1 wherein the polar liquid is water.

3. A method as recited in claim 1 and further comprising the steps of:

(a) waiting until the polar liquid has been absorbed by the mold and then (b) closing the mold before introducing the preexpanded plastic material in particulate form into the mold.

4. A method as recited in claim 1 and further comprising the step of selecting the ratio of the surface area of said one or more zones A fronting on the mold cavity to the surface area of said one or more zones B fronting on the mold cavity as a function of the thickness and surface area of the article to be molded.

5. A method as recited in claim 1 wherein the ratio of the surface area of said one or more zones A fronting on the mold cavity to the surface area of said one or more zones B fronting on the mold cavity is between 10/90 and 90/10.

6. A method as recited in claim 5 wherein the ratio of the surface area of said one or more zones A fronting on the mold cavity to the surface area of said one or more zones B fronting on the mold cavity is 50/50.

7. A method as recited in claim 1 wherein step (a) recited in claim 1 comprises the step of forming the mold from a plurality of modules which together define the mold cavity, each of said plurality of modules comprising said at least two juxtaposed porous materials, and said at least two juxtaposed porous materials in each of said modules both front on the mold cavity.

8. A mold suitable for the manufacture of expanded, non-polar plastic articles from pre-expanded particles by means of UHF radiation, said mold comprising:

(a) at least two juxtaposed porous materials which together define a mold cavity, the first of said at least two juxtaposed porous materials forming one or more zones A fronting on the surface of the mold cavity which have capillary forces which allow vapor developed in the interior of the cavity to escape from it into the mold, and the second of said at least two juxtaposed porous materials forming one or more zones B fronting on the surface of the mold cavity which have capillary forces which bring liquid from the interior of the mold to the mold cavity, thereby creating a harmonious liquid-vapor circulation, and (b) an impervious layer on the opposite side of said at least two juxtaposed porous materials from the mold cavity, which impervious layer prevents or retards loss of liquid from the mold and which thereby cooperates with said at least two juxtaposed porous materials to create said harmonious liquid-vapor circulation.

9. A mold as recited in claim 8 wherein the ratio of the surface area of said one or more zones A fronting on the mold cavity to the surface area of said one or more zones B fronting on the mold cavity is selected as a function of the thickness and surface area of the article to be molded.

10. A mold as recited in claim 9 wherein the ratio of the surface area of said one or more zones A fronting on the mold cavity to the surface area of said one or more zones B fronting on the mold cavity is between 10/90 and 90/10.

11. A mold as recited in claim 8 wherein the ratio of the surface area of said one or more zones A fronting on the mold cavity to the surface area of said one or more zones B fronting on the mold cavity is between 10/90 and 90/10.

12. A mold as recited in claim 9 wherein the ratio of the surface area of said one or more zones A fronting on the mold cavity to the surface area of said one or more zones B fronting on the mold cavity is 50/50.

13. A mold as recited in claim 8 wherein the ratio of the surface area of said one or more zones A fronting on the mold cavity to the surface area of said one or more zones B fronting on the mold cavity is 50/50.

14. A mold as recited in claim 8 wherein:

(a) the mold is formed of a plurality of modules which together define the mold cavity;

(b) each of said plurality of modules is comprised of said at least two juxtaposed porous materials; and (c) said at least two juxtaposed porous materials in each of said modules both front on the mold cavity.

15. A mold as recited in claim 14 wherein the ratio of the surface area of said one or more zones A fronting on the mold cavity to the surface of said one or more zones B fronting on the mold cavity is the same for each of said plurality of modules as it is for the mold as a whole.

* * * * *